(12) United States Patent
Meena et al.

(10) Patent No.: US 11,087,187 B2
(45) Date of Patent: Aug. 10, 2021

(54) SYSTEM AND METHOD FOR IMPROVING RECOGNITION OF CHARACTERS

(71) Applicant: LOGISTIMO INDIA PRIVATE LIMITED, Bangalore (IN)

(72) Inventors: Chandrakant Meena, Gangapur (IN); Arun Ramanujapuram, Bangalore (IN)

(73) Assignee: LOGISTIMO INDIA PRIVATE LIMITED, Bangalore (IN)

( * ) Notice: Subject to any disclaimer, the term of this patent is extended or adjusted under 35 U.S.C. 154(b) by 0 days.

(21) Appl. No.: 16/792,907

(22) Filed: Feb. 18, 2020

(65) Prior Publication Data
US 2020/0184287 A1    Jun. 11, 2020

(30) Foreign Application Priority Data
Feb. 26, 2019    (IN) .............................. 201941007388

(51) Int. Cl.
*G06K 9/78*    (2006.01)
*G06K 9/68*    (2006.01)
*G06K 9/72*    (2006.01)

(52) U.S. Cl.
CPC ............. *G06K 9/6857* (2013.01); *G06K 9/72* (2013.01); *G06K 9/78* (2013.01)

(58) Field of Classification Search
CPC ...... G06K 9/6256; G06K 9/72; G06K 9/6857; G06K 9/033; G06K 9/78
See application file for complete search history.

(56) References Cited

U.S. PATENT DOCUMENTS

| | | | |
|---|---|---|---|
| 2016/0247035 A1* | 8/2016 | Gross ....................... G06K 9/72 |
| 2018/0189592 A1* | 7/2018 | Annis ..................... G06K 9/344 |
| 2018/0268212 A1* | 9/2018 | Kubota ............. G06K 9/00463 |
| 2020/0013410 A1* | 1/2020 | Bond ...................... G10L 13/02 |
| 2020/0201532 A1* | 6/2020 | Livingston ............ G06F 3/0485 |

* cited by examiner

*Primary Examiner* — Sam Bhattacharya

(57) ABSTRACT

System and method for improving recognition of characters. A system for improving recognition of characters is disclosed. The system comprises at least one processor (10), configured to receive an image (1004) of an article (102) comprising characters to be recognized. The system (100) displays characters as recognized on a display screen (1006). Further, the system (100) is configured to receive user feedback comprising correction of an error made by the system (100) in recognizing at least one character and provide a system feedback comprising display of images or textual descriptions of one or more variants (1012, 1014, 1016, 1018, 1020, 1022) of a character, which is incorrectly recognized by the system, which enables the natural person to adapt writing style to enable better quality inputs to the recognition module. The article (102) is a handwritten paper form (102), filled and captured by the natural person.

13 Claims, 14 Drawing Sheets

SYSTEM AND METHOD FOR IMPROVING RECOGNITION OF CHARACTERS

BACKGROUND

Unless otherwise indicated herein, the materials described in this section are not prior art to the claims in this application and are not admitted to being prior art by inclusion in this section.

FIELD OF THE INVENTION

The subject matter in general relates to the field of optical character recognition. More particularly, but not exclusively, the subject matter relates to improving recognition of characters.

DISCUSSION OF THE RELATED ART

Across several industries, data may be collected on hand filled paper forms. Collection of data on hand filled paper forms is prevalent in public systems run by governments in low or middle-income countries, in business processes adopted by many private sector agencies, small business environments and unorganized sectors. For instance, in public health systems, data corresponding to patient's health and drugs/vaccines is collected in hand-written paper forms. Similarly, in a private sector company, documents such as quotations and invoices may be written on paper.

Conventionally, the hand-written forms are sent to data-entry operators, for updating the collected data into a computer system. However, there are several drawbacks in this approach. The operators may make errors in entering data due to lack of attention to detail or inability to accurately comprehend the hand writing of others. Additionally, this approach is time consuming, and could become a bottleneck in time sensitive processes. Further, this approach may be expensive and also may not be easily scalable.

An alternative or a complimentary solution to the above approach is the use of Optical Character Recognition (OCR) tools. In such a solution, one can envision either scanning or taking a photograph of the document (using a camera) and recognising the handwritten text on the form image using OCR. This can eliminate the need for a manual computer data entry, thereby improving the quality and timeliness of data at lesser cost. It is well known that OCR tools are not completely accurate. The accuracy levels fall significantly when the input is handwritten text. Adding to the challenge in recognizing handwritten text is the variations in handwriting. Another factor that may impact the quality of output is the quality of the input image. While scanners are known for presenting fairly good quality image to the OCR tools, the quality suffers when the input image is an image captured by a camera, such as a low-resolution camera of a smartphone. In such a case, many factors such as lighting, tilt or skew, lack of focus or blur, can affect the quality of the image, and consequently the recognition accuracy.

In view of the forgoing discussion, there is a need for a technical solution for improving recognition of handwritten characters.

SUMMARY

In an embodiment, a system is provided for improving recognition of handwritten characters. The system comprises at least one processor. The processor is configured to receive an image of an article comprising characters to be recognized by the system. The processor displays characters as recognized by the system, on a display screen of a computing device. The processor receives user feedback from a natural person, wherein the user feedback is a correction of an error made by the system in recognizing at least one character. The processor is further configured to provide a system feedback to the user, wherein the system feedback comprises display of images or textual descriptions, wherein the images may be of one or more variants of a word or character, which is incorrectly recognized by the system, as per natural person, so as to make improvements in writing in future.

In an embodiment, a method for improving recognition of handwritten characters is provided. The method comprising, receiving an image of an article, comprising handwritten characters. The method further comprising, recognizing the characters present in the image and displaying the recognized characters. The method further comprising, receiving user feedback from a natural person, wherein the user feedback is a correction of an error made in recognizing at least one character. The method further comprising a system feedback to the user, where in the system feedback comprises displaying images or textual descriptions, wherein the images may be of one or more variants of a word or character, which is incorrectly recognized, as per the natural person.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which.

DETAILED DESCRIPTION OF THE INVENTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

It should be understood that the capabilities of the invention described in the present disclosure and elements shown in the figures may be implemented in various forms of hardware, firmware, software, recordable medium or combinations thereof.

Overview

Disclosed is technical solution for improving recognition of characters, in accordance with an embodiment. A natural person captures an image of a handwritten paper, using a camera device (say, a mobile phone) or through a scanner. The system receives a digital image of the handwritten paper. The system uses a character recognition module to recognize one or more characters from the digital image. The recognized characters are displayed on a display screen of the mobile device. If the characters displayed are not similar to the characters present in the handwritten paper or if there are any errors in character recognition, the system allows the natural person to make changes to the characters. This is received by the system as a feedback from the natural person. Further, the system displays on the mobile device of the natural person, images or textual descriptions, wherein the images may be of one or more variants of the word or characters, which have been incorrectly recognized by the system, so as to make improvements in writing in future.

System for Improving Recognition of Characters

Figure 1:
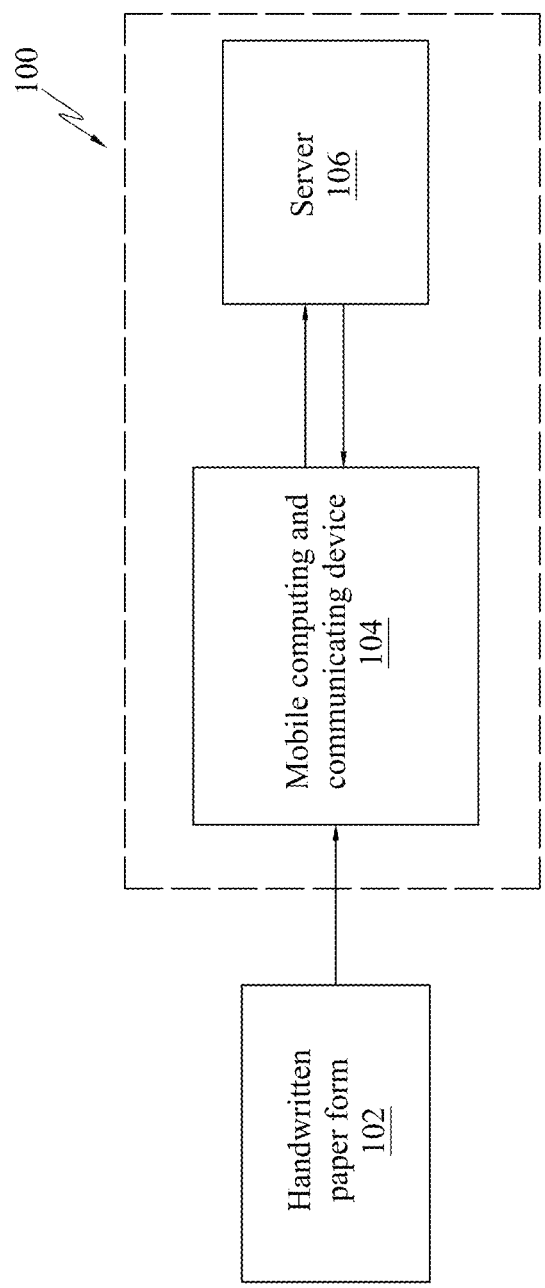
FIG. 1 illustrates a system 100 for improving recognition of characters, in accordance with an embodiment.

Referring to the figures, and more particularly to FIG. 1, a system 100 for improving recognition of characters is disclosed, in accordance with an embodiment. The system 100 may comprise an article, which may be a form 102, such as a handwritten paper form 102, which may comprise one or more handwritten characters that is to be recognized. The handwritten paper form 102 may be a structured or semi-structured document comprising a set of fields or tables which a natural person fills manually in a handwritten manner.

In an embodiment, the system 100 may be preconfigured with a schematic layout of the form 102 that is consistent across all instances of that form. The schematic layout may include two aspects, the schema and the layout. The schema may define relationship between data across various cells present in the form and may also include data validation rules for one or more cells. On the other hand, the layout may define the positioning of various cells in the form, dimension of the cells, or relative positioning and dimension of the cells.

The system 100 may further comprise a mobile computing and communicating device 104 and a server 106. The natural person may manually fill the form 102, and using a camera of the mobile computing and communicating device 104 may capture the image of the form 102. The image of the form may captured by means such as scanner as well. The image may then be communicated to the device 104.

Figure 2:
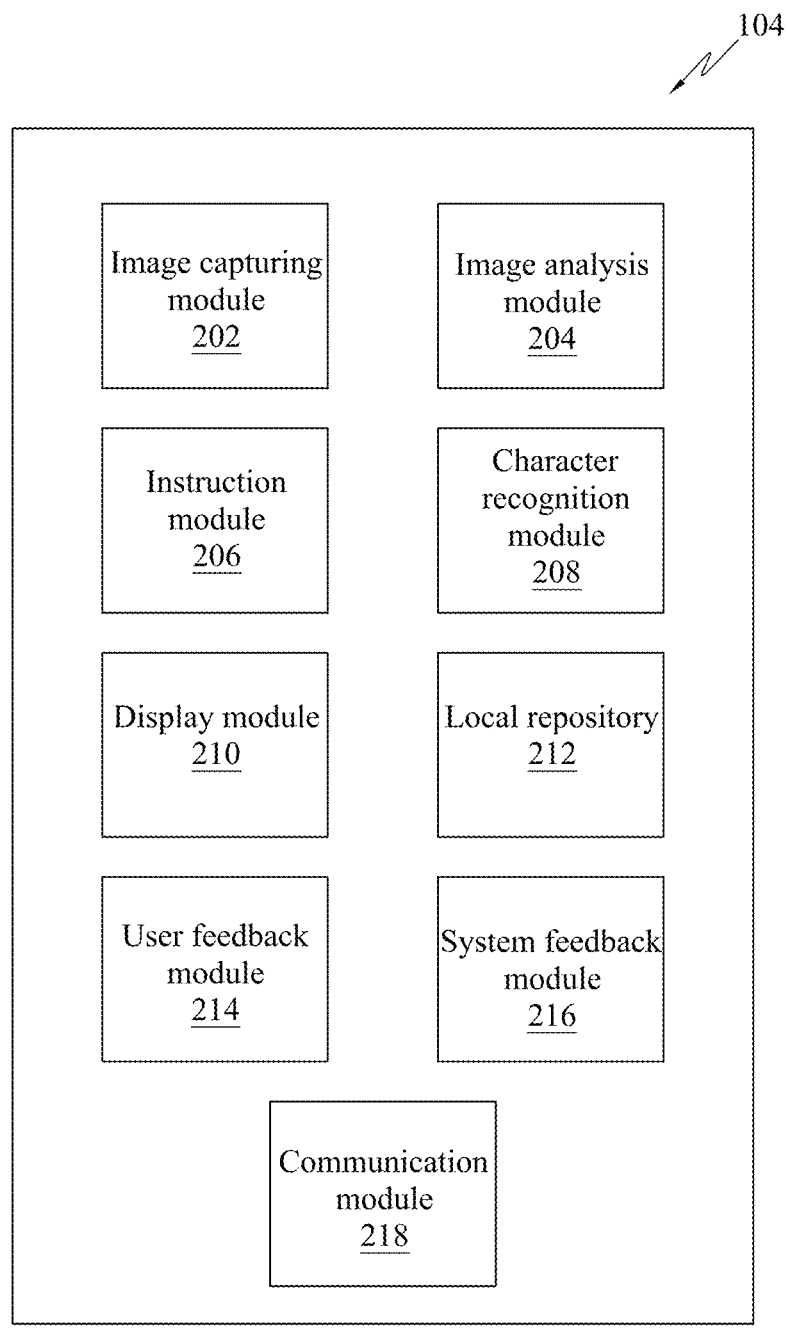
FIG. 2 illustrates various modules of a mobile computing and communication device 104, in accordance with an embodiment.

Referring to FIG. 2, various modules of the mobile device 104 are disclosed, in accordance with an embodiment. The mobile computing and communication device 104 may be smart phone, PDA, tablet PC, notebook PC, desktop, kiosk or laptop, among like computing devices. However, considering one of the use cases in which the device used may be mobile or portable in nature, the device mentioned above is referred to as mobile computing and communication device 104 or mobile device 104. However, the device 104 may also include a device that may not necessarily be readily portable or mobile.

In an embodiment, the mobile device 104 may comprise an image capturing module 202, an image analysis module 204, an instruction module 206, a character recognition module 208, a display module 210, a local repository 212, a user feedback module 214, a system feedback module 216 and a communication module 218.

In an embodiment, the image capturing module 202 may be configured to capture digital images of the form 102. As an example, the image capturing module 202 may be the camera of the mobile device 104.

In an embodiment, the digital image of the form 102 may be received by the image analysis module 204 of the mobile device 104 for analysing the digital image. The image analysis module 204 may comprise image processing, noise correction, and real time image analysis algorithms, gyroscope and other motion sensors to determine quality of the digital image with respect to brightness, skew, blur, and background color, among others. For instance, quality of the digital image may vary depending on camera resolution, focus, lighting or tilt of image capturing module, among others. Such conditions are typically difficult for the natural person to discern. Moreover, the images captured from the image capturing module 202 tends to be always skewed by a certain angle. The image analysis module 204 may be configured to enhance the quality of the digital image through operations including, but not limited to, noise removal, skew removal, thinning and morphological operations. Further, thresholding operations may also be applied to convert the digital image into a binary image to make it easier to work with machines.

In an embodiment, the image analysis module 204 may also determine, whether the captured digital image meets the quality requirements or not. If the quality of the digital image is determined to be low, the image analysis module 204 may communicate instruction to the instruction module 206. The instruction module 206 may be configured to instruct the natural person to take a better image of the form 102. The instructions may be communicated to the natural person by highlighting errors in the captured image. Further, instructions to the natural person on retaking image, based on the problems detected may be personalised using the person's past history of errors. For instance, the natural person may be instructed to increase lighting, focus better, use auto-focus and reduce camera tilt, among others by the instruction module 206 of the mobile device 104. Based on a record of the historical errors by the same natural person, the instruction module 206 may construct the most relevant message, i.e., personalize the message to be given to the natural person to improve image quality to improve its effectiveness. For instance, if the natural person historically titled the camera too much, the instruction module 206 could additionally indicate the count of the number of times tilt was high, and what the natural person could do to correct this. The instruction module 206 also keeps track of the types of instructions provided to the user in the past, and modulates the frequency of the same or similar feedback to ensure that the natural person is not repetitively receiving the same or similar feedback after each form filling.

In an embodiment, the image analysis module 204 may be configured to instruct the natural person to define boundary of the image (form). The boundary may be highlighted automatically, and further the natural person may adjust the boundary, to obtain the digital image of the form, which needs to be processed. The image analysis module 204 may display a magnified view of the boundary of the form in a separate area of the display screen to help the natural person visualize easily, since the natural person's finger or a device cursor may be obstructing the view of the boundary line as the natural person begins to adjust it on the form image.

In an embodiment, the image analysis module 204 may be configured to identify or segment field, table and cell boundaries in the form 102, using structural features, geometric features and content features. The image analysis module 204 may identify and segment field or cell areas in the digital image and further segment the characters within the determined field or cell areas. A form layout configuration may be specified by natural persons as a part of the form schema, which may include information on structural layout and content rules, that can be leveraged to segment the form. The structural layout may specify how the fields or cells are spatially laid out in the form including field positions and their relative size, in addition to any other structural layout details. The image analysis module 204 may communicate the field or cell segments to the character recognition module 208 for character recognition of the form 102.

In an embodiment, the character recognition module 208 may be a known Optical Character Recognition (OCR) engine, which helps in recognition of characters or words present in the digital image. Further, the OCR engine may extract features of the image, including geometrical or statistical features and classify the image into a particular class using artificial intelligence techniques and machine learning, Bayesian networks and classifiers, among others. A learning OCR algorithm such as Convoluted Neural Networks (CNN) or any other appropriate machine-learning algorithm may be used in the mobile device 104.

In an embodiment, the words or characters recognized by the character recognition module 208 may be displayed to the natural person using the display module 210 of the mobile device 104. The display module 210 may further be configured to display the digital image of the recognised word or character segmented using the image analysis module 204. The digital image of the word or character and the corresponding words or characters recognised may be displayed adjacent to each other. Any words or characters automatically detected to have probable errors may be flagged to the user (say, using a different coloured font or background).

In an embodiment, the local repository 212 may comprise images of characters along with character labels depicting the character contained within the image, also referred to as a "labelled image". These labels are derived by the corrective feedback given by the natural person in a previous form data capture session. The local repository 212 may have stored labelled images of one or more variants of the characters. The local repository 212 may also store statistics of the kinds of errors in recognition along with the labelled character images. The labels could be associated with a character image or even an entire word image, depending on whether the character recognition module 208 was configured to recognise individual characters or words. The local repository 212 may be accessed by the mobile device 104, even in the absence of internet.

In an embodiment, the user feedback module 214 may be configured to receive feedback from the natural person. The feedback from the natural person may correspond to correction of an error (corrective feedback) that may have occurred due to incorrect recognition of the character in the digital image by the character recognition module 208. The natural person may correct the errors using the display module 210. Further, the corrective feedback on character image may be stored in the local repository 212 as labels, along with the character image, wherein the labels correspond to the identified character within the image, as per the natural person. Statistics or counts on the feedback may also be stored in the local repository including, but not limited to, the number of errors of a particular character recognition and time taken by the natural person to correct.

In another embodiment, the user feedback module 214 may be configured to identify images that are similar to the image of the character that has been identified by the natural person as being wrongly recognised by the character recognition module 208. The user feedback module 214 may further automatically identify if the character recognition was in error if similar images in the local repository 212 or digital repository 302 had a label that was different from the recognition output of the character recognition module 208. Image similarity is determined by extracting features of images into an n-dimensional vector, and evaluating a "distance" between the feature vectors (such as Euclidean distance). Closer the distance, the more similar the images, and higher the similarity matching score. The user feedback module 214 may auto-correct the incorrectly recognized character in the identified images, wherever the similarity matching score is above a specified threshold.

In an embodiment, the system feedback module 216 may be configured to provide a system feedback based on corrected character labels received from the user feedback module 214. The system feedback module 216 may retrieve, either from the local repository 212 or digital repository 302, digital images with the same label as the label assigned, by way of correction, to the image of the character. The system feedback module 216 may guide the natural person to adapt the writing style to improve character recognition through a combination of textual feedback and display of character or word images to help adapt writing style.

In another embodiment, the system feedback module 216 may be configured to display one or more standardised writing styles for the character that may be recognized as incorrect by the natural person. These writing styles are displayed using images that are similar to that character image but with slight differences which might impact recognition accuracy (for instance, a straight nine versus a curved nine).

In an embodiment, a particular character repetitively recognised as incorrect by the natural person, across sessions, may be flagged for the style of writing.

In an embodiment, an image similarity algorithm may be configured in the system feedback module 216 to evaluate a Cartesian or Euclidean distance between the character image features. Further, domain rules are leveraged in the system feedback module 216, to detect potential errors so that natural person's attention can be focussed to those characters, during the correction process by the natural person. Image similarity is determined by extracting features of images into an n-dimensional vector, and evaluating a "distance" between the feature vectors (such as Cartesian or Euclidean distance). Closer the distance, the more similar the images, and higher the similarity matching score.

In an embodiment, the system feedback module 216 may be configured to display errors corresponding to overlapping of characters, characters overrunning cell or field boundaries among others, so that the natural person refrains from repeating such errors in future.

In an embodiment, the system feedback module 216 may provide feedback by displaying one or more variants of images for the character identified as incorrect by the natural person, wherein the variants of images have been provided by a community of users.

In an embodiment, the system feedback module 216 may be configured to display one or more variants of images of characters, wherein the variants of images may be a combination of both, the natural person's and from a community of users.

In an embodiment, the communication module 218 may be configured to communicate data with the server 106. The communication module 218 may include a wired network, a wireless network, or a combination of wired network and wireless network. For example, the communication network may include local area network, wide area network, and metropolitan area network, among others.

Figure 3:
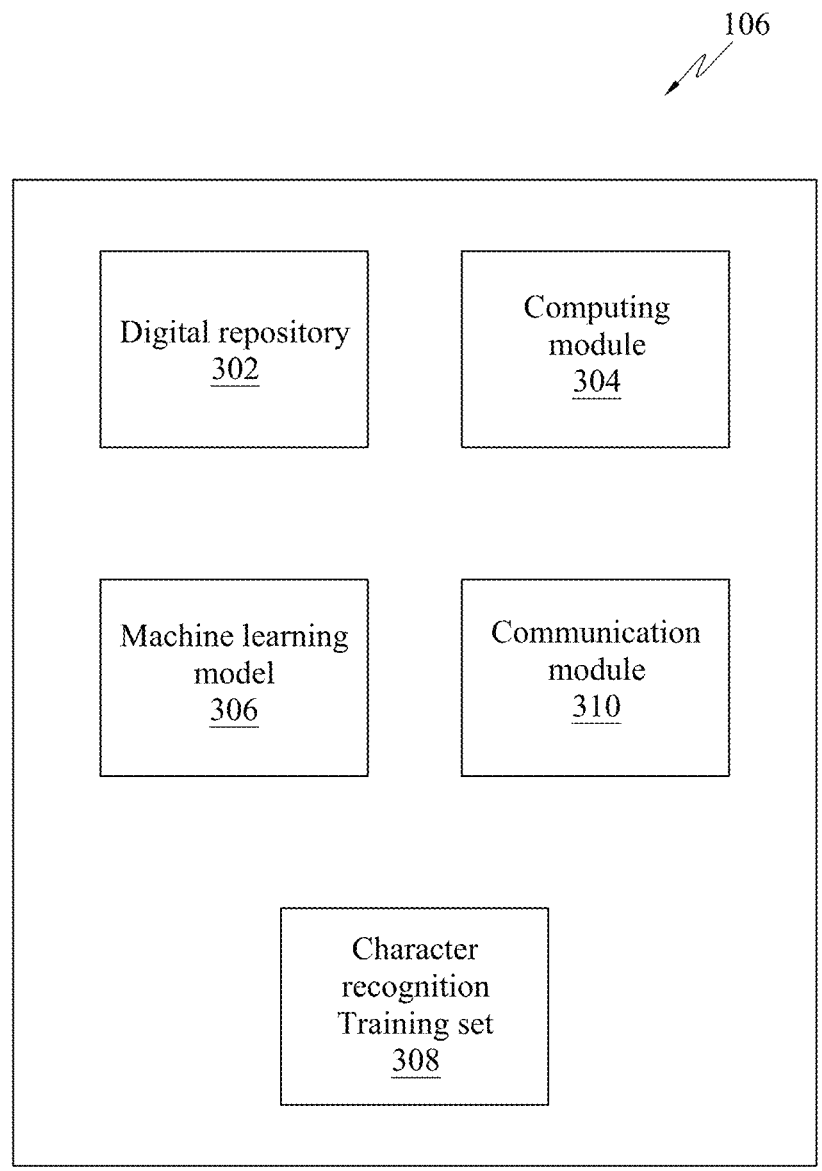
FIG. 3 illustrates various modules of a server 106, in accordance with an embodiment.

Referring to FIG. 3, various modules of a server 106 are disclosed, in accordance with an embodiment. The server 106 may be implemented in the form of one or more processors with a memory module coupled to the one or more processors with one or more communication module 310. The server 106 may communicate with one or more external sources and one or more mobile device 104 through the communication module 310.

In an embodiment, the server 106 may comprise a digital repository 302, a computing module 304, a machine learning model 306 and a character recognition training set 308.

In an embodiment, the communication module 310 may be configured to communicate data with the mobile devices 104. The communication module 310 may include a wired network, a wireless network, or a combination of wired network and wireless network. For example, the communication network may include local area network, wide area network, and metropolitan area network, among others.

In an embodiment, the images of characters, with their corresponding labels, across the community of users within a domain or geography may be present in the digital repository 302.

In an embodiment, the computing module 304 may be configured to identify a set of images from the digital repository 302 that are similar to the image of the character or word that has been provided a corrective label by the natural person.

In an embodiment, the computing module 304 may be configured to assign a confidence score to the label of the image of the character based on the degree of match with the labels of the set of identified, similar images. As an example, weighted majority voting technique may be used for deriving confidence score.

In an embodiment, the computing module 304 may be configured to compute a reputation score for the natural person, wherein the reputation score may be computed based on at least one of historical data associated with the matches between the label assigned by the natural person and the labels selected from the digital repository 302. Further, the reputation score may be assigned based on the quality of corrections provided by the natural person. For instance, the percentage of matches of a natural person's feedback labels with that provided by the community for similar images over a specified period could determine a reputation score for that person. The reputation scoring algorithm could also incorporate external inputs about the correctness of data entry by the natural user in other systems.

In an embodiment, the computing module 304 may further be configured to communicate the image of the character identified by the natural person with the corrected label and the confidence score to the digital repository 302.

In an embodiment, the machine learning model 306 may be configured to recognise characters in the digital image based on at least the images of the characters. The machine learning model 306 may be trained with a training set 308 comprising of labelled data, generated by labelling the image of characters by the natural person(s).

In an embodiment, the character recognition training set 308 may be configured to include a labelled dataset by receiving labels from the corrective feedback given by the community of users. The labelled dataset may be validated and used to enhance a global training set in the global training set repository 308. This training set is used to periodically retrain the machine learning model 306 to improve accuracy of recognition. Further, a customised character recognition training set may be generated in the training set repository 308, that may enable creation of customised machine learning model that works more accurately for a specific community of users.

In an embodiment, the server 106 may be configured to communicate the retrained machine learning model 306 to a group of computing devices. The global model is available to all devices. The customised model is made available to the devices of a community of users to whom it was customised. For example, there could be a model customised to a group of users within a geography or within a particular industry (such as Healthcare) which works accurately for that group.

Having discussed various modules of the device 104 and the server 106, the methods involved in improving recognition of characters are discussed hereunder.

Figure 4:
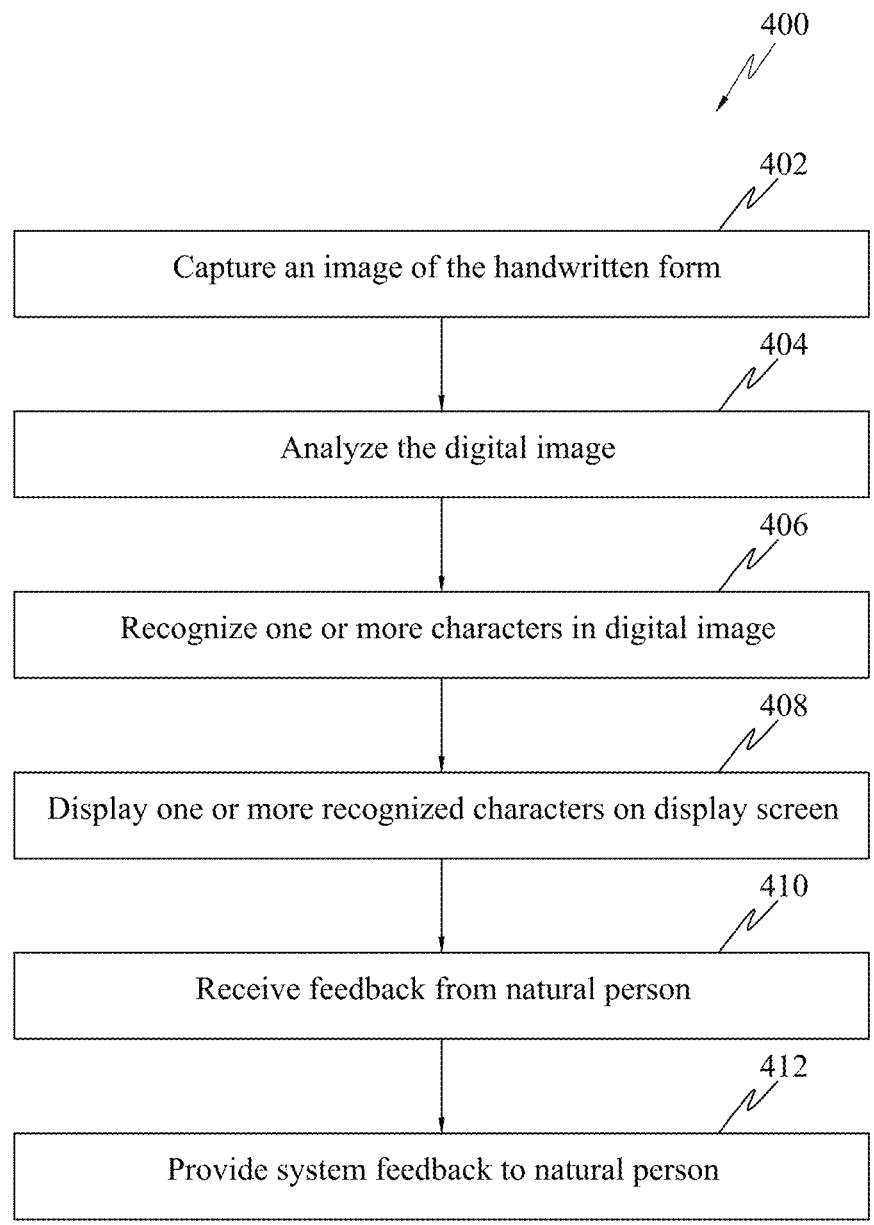
FIG. 4 illustrates a flowchart 400, for improving recognition of characters, in accordance with an embodiment.

FIG. 4 illustrates a flowchart 400 for improving recognition of characters, in accordance with an embodiment.

Referring to step 402, the natural person may fill a handwritten paper form 102 and may capture the image of the hand filled paper form 102 using the image capturing module 202.

Referring to step 404, image analysis module 204 may analyse quality of the digital image to ensure whether the captured image possesses required quality for further image processing and character recognition. It may be noted that if the quality of the image is not acceptable, then instruction is provided to the user to recapture the image. In an embodiment, instruction to the user may include suggestions to overcome a cause that may have resulted in poor quality image. The image quality if acceptable, may undergo segmentation. Segmentation may include identification of cells within the form, in which characters may be present.

Referring to step 406, the image analysis module 204 may communicate the digital image to the character recognition module 208 for recognition of one or more characters in the digital image.

Referring to step 408, one or more characters present in cells, as recognized may be displayed to the natural person using the display module 210. The one or more characters may be displayed adjacent to an image of the character, obtained from the digital image of the handwritten paper form 102.

Referring to step 410, the natural person may provide feedback, corresponding to the errors in recognizing at least one character in the digital image, using the user feedback module 214. The natural person may provide feedback, by correcting, wrongly recognized characters, using the display module 210.

Referring to step 412, a system feedback module 216 may provide the natural person with system feedback, wherein the system feedback may comprise textual descriptions on incorrect form writing, such as character overlaps, or character images that may be similar to the digital image recognized as wrong entry by the natural person, and are more likely to be recognised accurately by the character recognition module 208.

Figure 5:
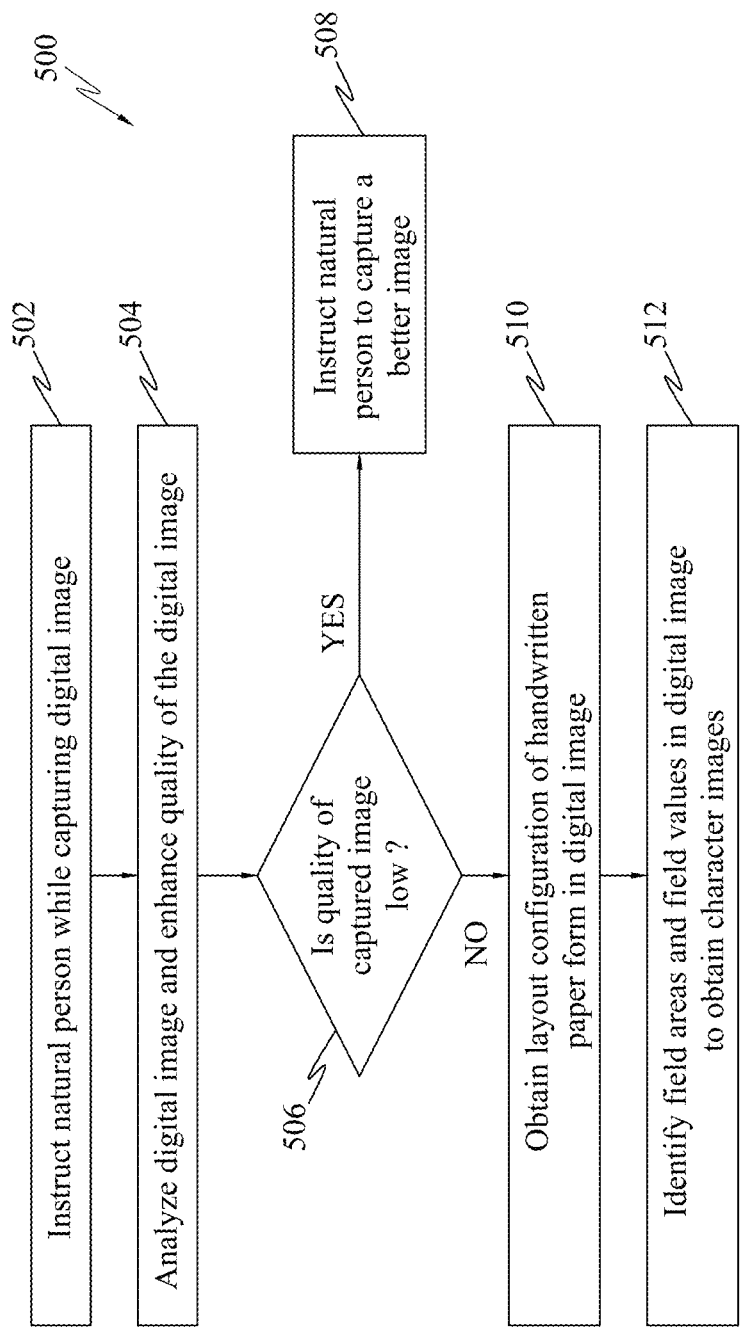
FIG. 5 is a flowchart 500, illustrating the working of an image analysis module 204, in accordance with an embodiment.

FIG. 5 is a flowchart 500, illustrating working of the image analysis module 204, in accordance with an embodiment.

Referring to step 502, the image analysis module 204 may be configured to provide the natural person with instructions while capturing the digital image of the handwritten form 102. The natural person may be instructed to ensure proper focus, tilt and lighting while capturing the digital image.

Referring to step 504, once the natural person has captured the digital image, the image analysis module 204 may analyse the digital image to determine problems including but not limited to blur, brightness, and skew. If the quality of the digital image is low, the image analysis module 204 may enhance the digital image by performing noise removal, skew removal, thinning, morphological operations and other enhancement operations on the digital image.

At step 506, the image analysis module 204 may analyse whether the captured digital image meets the requirement for further operations such as character recognition among others.

If the image analysis module 204, at step 506, determines that the quality of the image does not meet the requirements, the instruction module 206, at step 508, may provide the natural person with instructions corresponding to recapturing the image of the handwritten paper form 102. The instructions may be to increase lighting, focus better, use auto-focus or reduce camera tilt, among others. Instructions may be personalised based on a history and statistics of similar errors by the natural person that is stored in local repository 212 or digital repository 302.

If the image analysis module 204, at step 506, determines that the quality of the image does meet the requirements, the image analysis module 204, at step 510, may obtain the form layout configuration of the handwritten paper form 102 from the digital image to segment the image. The form layout configuration may include information on structural layout and content rules, which can be leveraged to segment the form. The structural layout may specify how the fields or cells are spatially laid out in the form including field positions and their relative size.

At step 512, the image analysis module 204 may first identify or segment the fields or cells in the image. The fields or cells are segmented using structural, geometric or content features some of which are specified in the form layout configuration. For instance, the layout information about the relative length or breadth of a cell can be used to more accurately segment the cell in a table. As another instance, the printed content in the image can be recognised accurately using a standard OCR engine to determine the position of its cell, and thereby understand the relative position of other cells around it or across the form. Such features are utilised in the segmentation process to improve accuracy of segmentation. The image analysis module 204 may further segment each word or sentence into further units comprising of character images or word images (in the case of a sentence).

Figure 6:
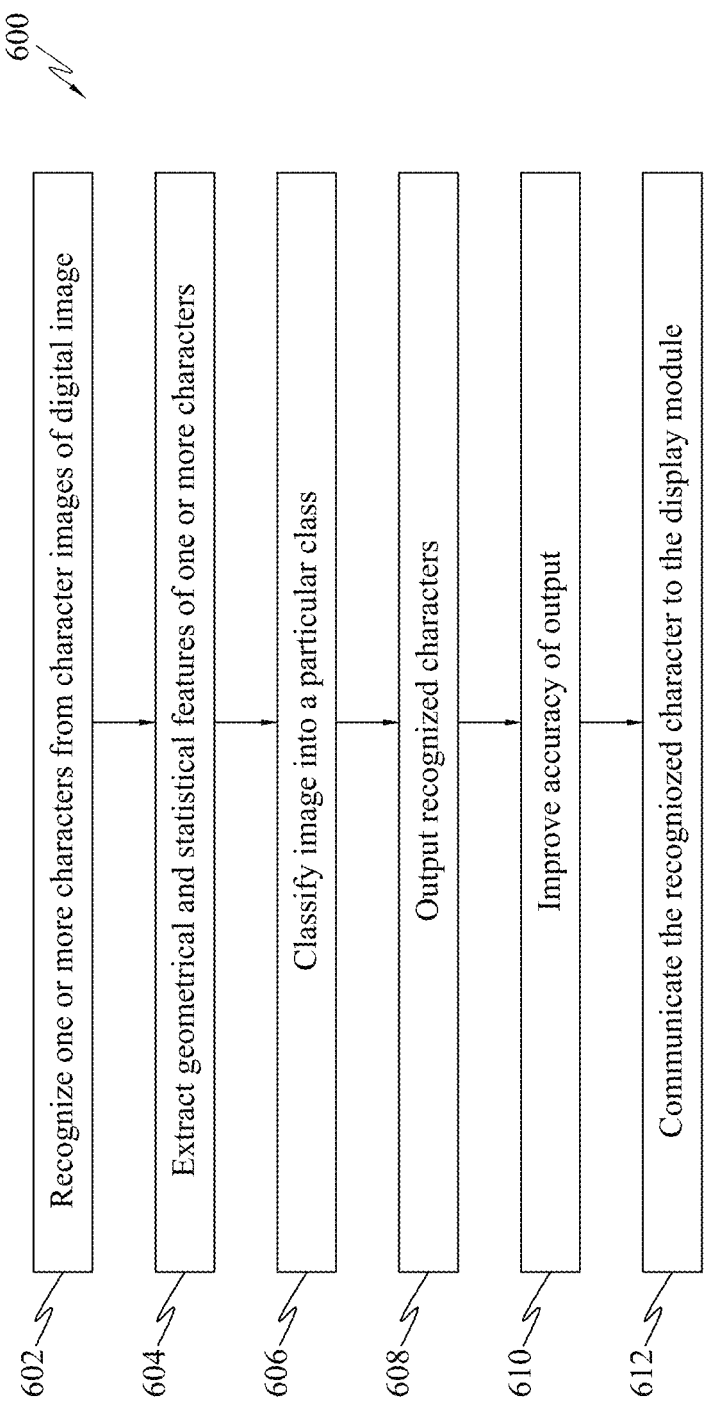
FIG. 6 is a flowchart 600, illustrating the working of a character recognition module 208, in accordance with an embodiment.

FIG. 6 is a flowchart 600, illustrating the working of the character recognition module 208, in accordance with an embodiment.

Referring to step 602, the character recognition module 208 may recognize one or more characters from the obtained character images.

Referring to step 604, using the character recognition module 208, the geometrical and statistical features of recognized one or more characters may be extracted. This step may be referred as feature extraction of characters, from the recognized one or more characters.

Referring to step 606, the character recognition module 208 may classify the character images into a particular class using artificial intelligence machine learning algorithms, Bayesian networks and classifiers, among others.

Referring to step 608, one or more recognized character images may be output using the character recognition module 208.

Referring to step 610, post-processing may be done on the output to improve the accuracy of results, including contextual approaches, dictionary look-ups and classifiers, among others.

Referring to step 612, the character recognition module 208 may communicate the one or more recognised characters to the display module 210.

Figure 7:
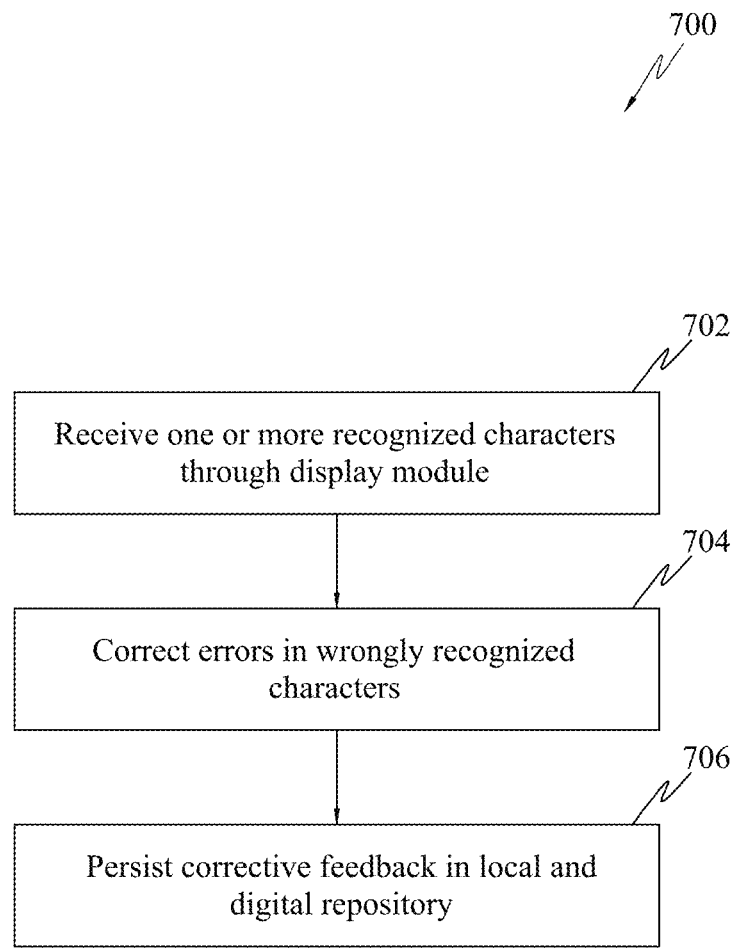
FIG. 7 is a flowchart 700, illustrating the working of a user feedback module 214, in accordance with an embodiment.

FIG. 7 is a flowchart 700 illustrating the working of a user feedback module 214, in accordance with an embodiment.

Referring to step 702, the display module 210 may receive the one or more recognized characters or words corresponding to the character or word image, by the character recognition module 208, and display the same on the display screen of the mobile device 104.

Referring to step 704, the natural person may review the output and may provide a feedback, by correcting the wrongly recognized characters or words. In an embodiment, the system may be configured to automatically identify potential errors and highlight the same on the display of the device 104 so that user's attention is focused on the errors.

Referring to step 706, the corrective feedback including the labelled character or word images provided by the natural person may be persisted in the local repository 212 and the digital repository 302, along with error statistics and other information such as time taken to correct recognition errors. Further, labelled images may be used to automatically detect or correct errors in future form data capture sessions, generate system feedback or to train machine learning model 306, by feeding as training sets. The data set corresponding to images of characters with their corresponding labels and confidence score may be fed to the training sets, to improve character recognition of the machine learning model 306.

Figure 8:
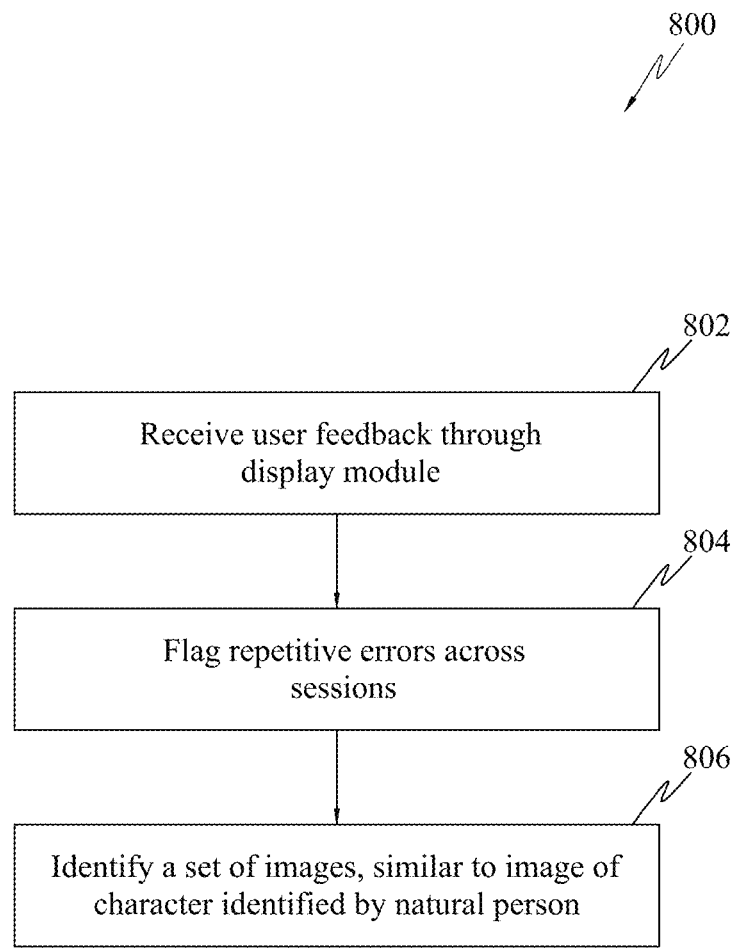
FIG. 8 is a flowchart 800, illustrating the working of a system feedback module 216, in accordance with an embodiment.

FIG. 8 is a flowchart 800, illustrating the working of a system feedback 216, in accordance with an embodiment.

Referring to step 802, the user may correct the wrongly displayed character or word corresponding to the character or word image.

Referring to step 804, the system feedback 216 may flag the repetitive errors across sessions and display the same on the display screen.

Referring to step 806, the system feedback 216 may display character or word images similar to the one the natural person has wrongly written, so that the natural person may adapt his/her style of writing of that character or word to a style of writing that will improve recognition accuracy. Further, the system feedback 216 may alert the natural person to write certain characters in a different way. For instance, presenting the natural person a set of possible alternative ways of writing a given character, such as curved versus straight line "9", by retrieving individual character images, similar to the natural person's image, using an image similarity algorithm. Similarly, the system retrieve a set of word images to indicate how a given word may be written. These images may be retrieved from a pool of correctly recognized images, that may be created in past sessions by the same person or by other persons in the community, that may be present in the local repository 212 and digital repository 302. This aids the natural person to adapt his/her writing more easily to one of the prescribed styles of writing it, which may lead to higher accuracy in output of character recognition module 208.

In an embodiment, a set of predetermined guidelines, such as writing within cell boundaries and non-overlapping numbers, among others may be presented as textual description along with images that illustrate the way to write, to the natural person and errors due to character overlapping or cell or field boundary overrunning may be highlighted on the display screen. Hence, following these guidelines, the natural person may be more careful, while writing in future cases.

Figure 9:
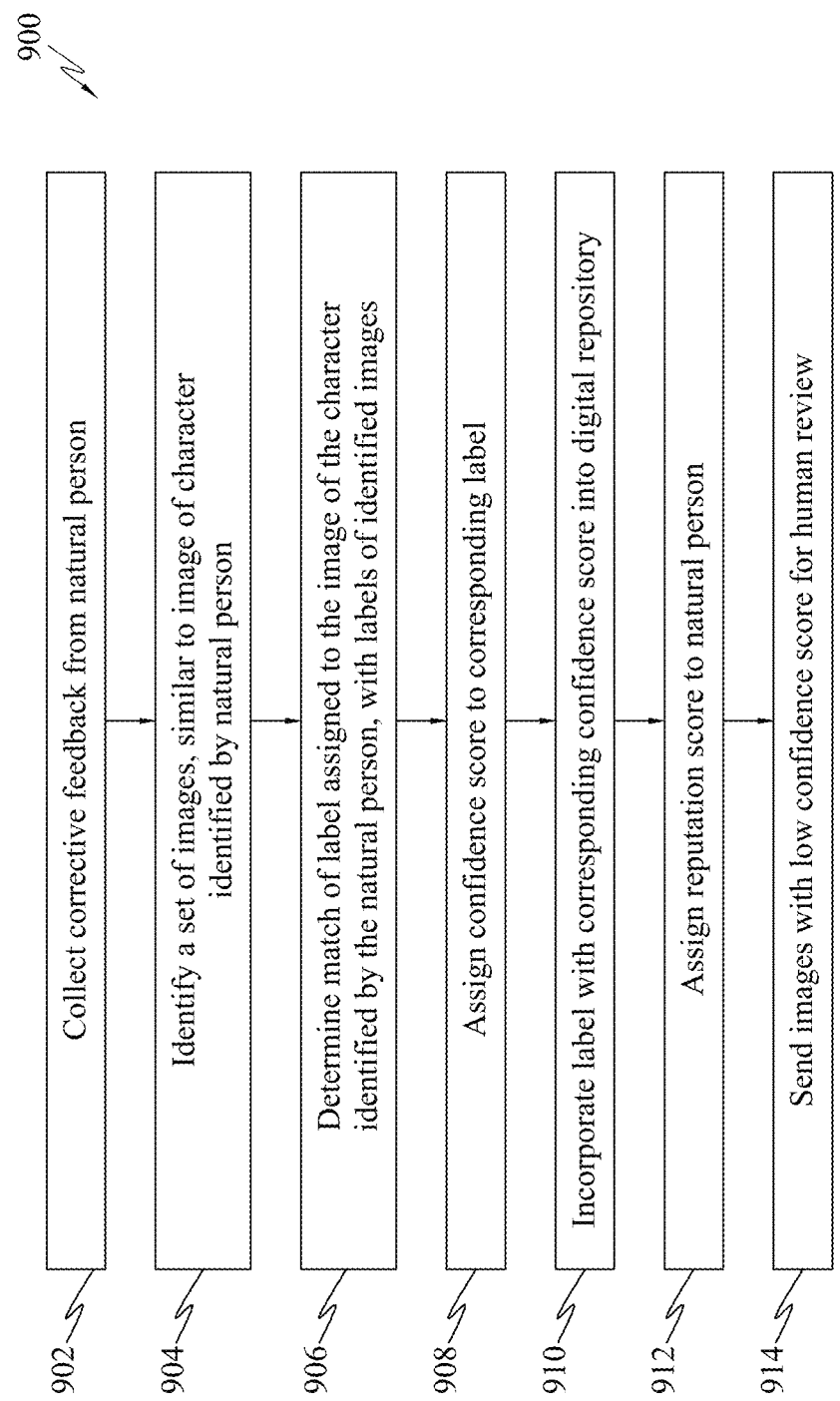
FIG. 9 is a flowchart 900 illustrating the training of the machine learning model 306, in accordance with an embodiment.

FIG. 9 is a flowchart 900 illustrating the training of the machine learning model 306, in accordance with an embodiment.

Referring to step 902, the corrective feedback provided by the community of users or natural persons may be collected to generate a labelled dataset. Labelled images created through the process of error correction from different users may be communicated to the digital repository 302 of the server 106. The server 106 may store the corresponding labels in the digital repository 302.

Referring to step 904, the computing module 304 may identify a set of character images present in the digital repository 302, where the character images identified may be similar to an image of the character that has been identified by the natural person, as being incorrectly recognized by the system 100.

Referring to step 906, the computing module 304 may compare the received label with the labels of the identified images, which are obtained from the digital repository 302.

Referring to step 908, the computing module 304 may assign a confidence score to the label based on the degree of match of the image in question to the set of images labelled by the community. The higher the degree of match or agreement with the community labels, the higher the confidence of the correctness of the label for the character image in question.

Referring to step 910, the computing module 304 may incorporate the image of the character, identified by the natural persons and the corresponding label and the confidence scores into the digital repository 302. The corresponding labelled data may be communicated to the character recognition training set 308 to train the machine learning model 306.

Referring to step 912, the computing module 304 may further assign a reputation score to each of the natural persons, based on at least one of historical data associated with matches between the label assigned by the natural person, with the labels selected from the digital repository 302. The reputation score determines the error correction capability of the natural person based on historical data on the degree of match with community generated labels. Parameters including, but not limited to, prior errors in labelling, that may be determined by a disagreement with other community labels, and data correction consistency by the natural person, may be used to arrive at the reputation score for each natural person.

In an embodiment, an ensemble technique, such as weighted majority voting may be used to arrive at the decision on the label quality, with the reputation scores of the natural persons to arrive at a decision on the quality of the label.

Referring to step 914, images with confidence score below specified thresholds may passed through a human review for further validation or omitted from the training set 308.

FIGS. 10A-10D illustrate an exemplary embodiment of working of the system 100. A digital image 1004 of a handwritten form 102 may be captured by the natural person using the image capturing module 202. The digital image 1004 may be displayed on a display screen 1006 of the mobile device 104. Further, a set of characters 1008 recognized by the system 100 maybe displayed adjacent to the digital image 1004. The user may correct the incorrectly recognized characters such as "3" and "9", to "8", on the display screen 1006. The corrective feedback 1010 is illustrated in the FIG. 10C.

Figure 10A:
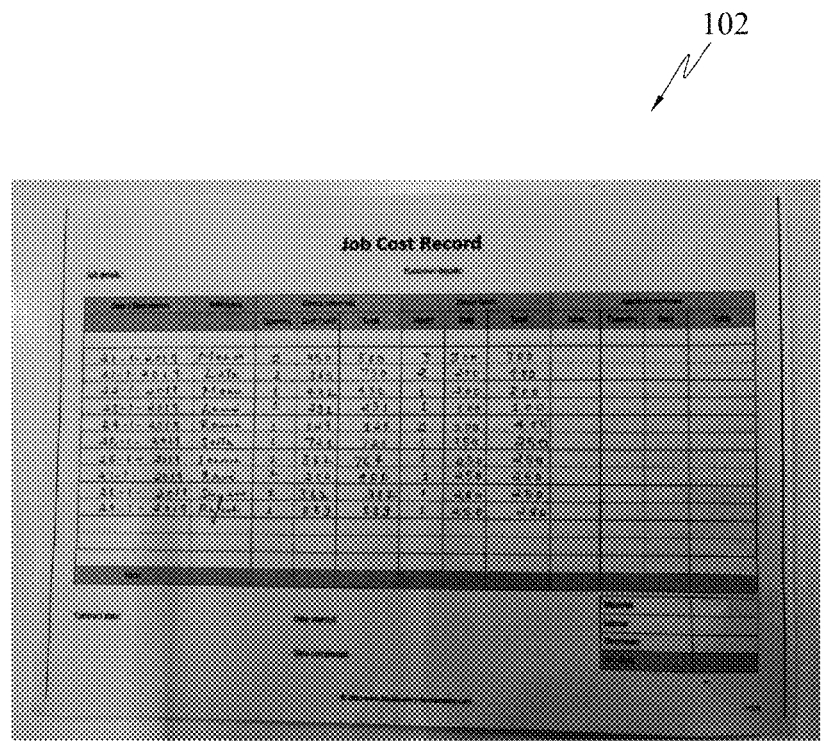
FIGS. 10A-10D illustrate an exemplary embodiment of working of the system 100.
Figure 10B:
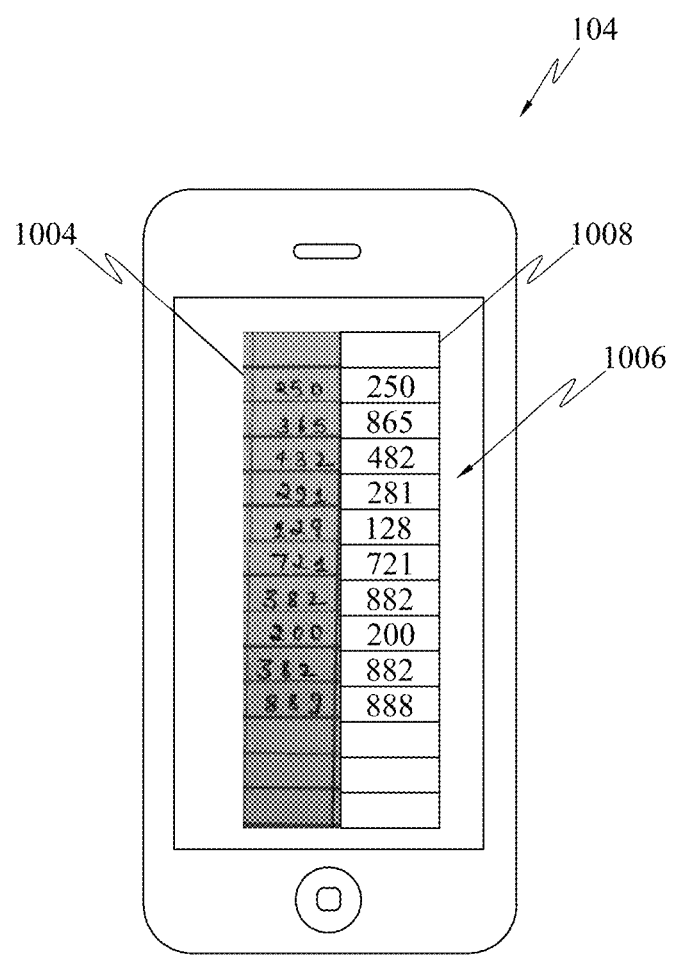
Figure 10C:
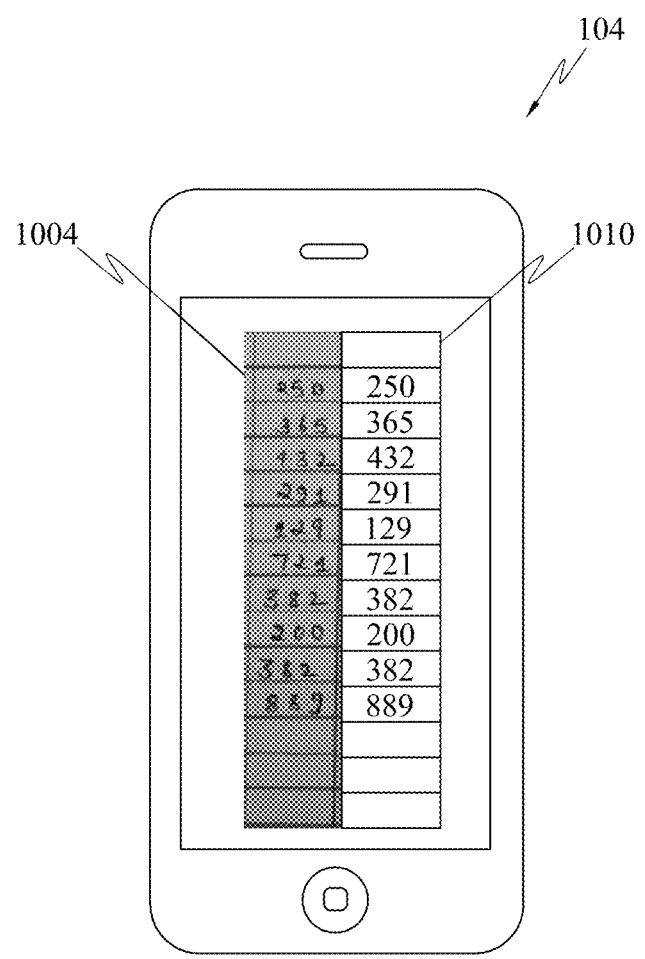
Figure 10D:
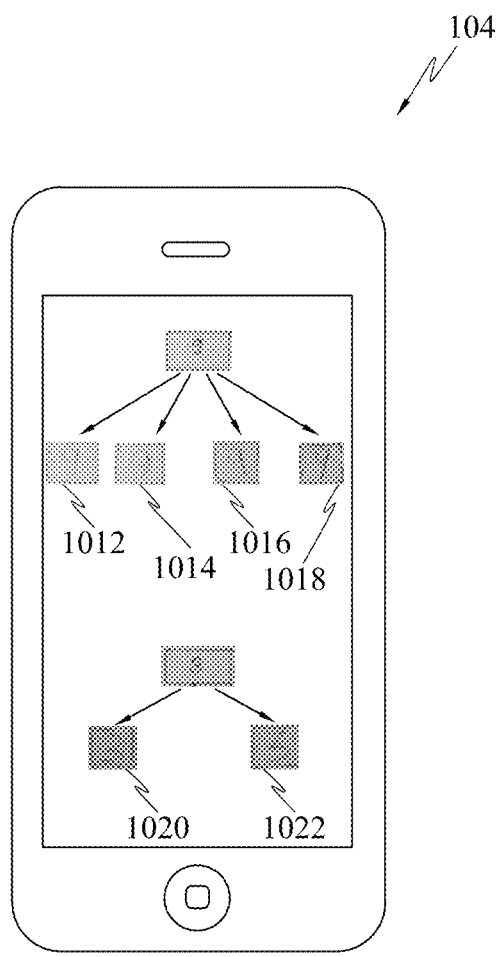

Referring to FIG. 10D, the system feedback module 216 may display one or more character images 1012, 1014, 1016, 1018, 1020, 1022 similar to the image being identified as incorrect by the natural person. For instance, numerical "9" has been identified as "8" and numerical "3" has been identified as "8". The system feedback module 216 may present the natural person a set of possible alternative ways of writing a given character, such as curved versus straight line "9", by retrieving individual character images 1012, 1014, 1016, 1018, similar to the natural person's image, using an image similarity algorithm. Likewise, numerical "3" may be present by retrieving character images 1020, 1022. These images may be retrieved from a pool of correctly recognized images, that may be created in past sessions by the same person or by other persons in the community, that may be present in the local repository 212 and digital repository 302.

Figure 11:
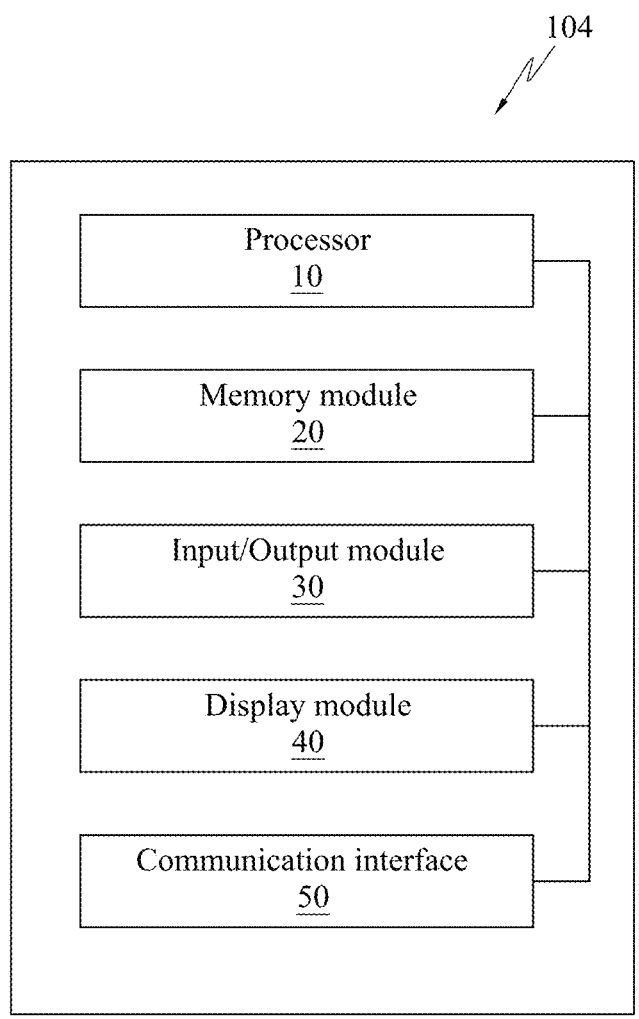
FIG. 11 illustrate a hardware configuration of the mobile device 104, in accordance with an embodiment.

FIG. 11 illustrates a hardware configuration of the mobile device 104, in accordance with an embodiment.

In an embodiment, the mobile device 104 may include one or more processors 10. The processor may be implemented as appropriate in hardware, computer-executable instructions, firmware, or combinations thereof. Computer-executable instruction or firmware implementations of the processor 10 may include computer-executable or machine-executable instructions written in any suitable programming language to perform the various functions described. Further, the processor 10 may execute instructions, provided by the various modules of the mobile device 104.

In an embodiment, the mobile device 104 may include a memory module 20. The memory module 20 may store additional data and program instructions that are loadable and executable on the processor 10, as well as data generated during the execution of these programs. Further, the memory module 20 may be volatile memory, such as random-access memory and/or a disk drive, or non-volatile memory. The memory module 20 may be removable memory such as a Compact Flash card, Memory Stick, Smart Media, Multimedia Card, Secure Digital memory, or any other memory storage that exists currently or will exist in the future.

In an embodiment, the mobile device 104 may include an input/output module 30. The input/output module 30 may provide an interface for inputting devices such as keypad, touch screen, mouse, and stylus among other input devices; and output devices such as speakers, printer, and additional displays among other.

In an embodiment, the mobile device 104 may include a display module 40 may be configured to display content. The display module 40 may also be used to receive an input from a user. The display module 40 may be of any display type known in the art, for example, Liquid Crystal Displays (LCD), Light emitting diode displays (LED), Orthogonal Liquid Crystal Displays (OLCD) or any other type of display currently existing or may exist in the future.

In an embodiment, the mobile device 104 may include a communication interface 50. The communication interface 50 may provide an interface between the mobile device 104, server 106 and external networks. The communication interface 50 may include a modem, a network interface card (such as Ethernet card), a communication port, or a Personal Computer Memory Card International Association (PCM-CIA) slot, among others. The communication interface 50 may include devices supporting both wired and wireless protocols.

In an embodiment, the server 106 may include processors, memory module, the input/output module and communication interface. The processors of the server 106 may execute various instructions of the modules provided in the server 106.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system (100) for improving recognition of handwritten characters, the system (100) comprising at least one processor (10) configured to:
    receive an image (1004) of an article (102) comprising characters to be recognized by the system (100);
    recognize the characters or words present in the image;
    display characters or words as recognized by the system (100), on a display screen (1006);
    receive user feedback from a natural person, wherein the user feedback is a correction of an error made by the system (100) in recognizing at least one character or word;
    provide a system feedback, wherein the system feedback comprises display of images of one or more variants (1012, 1014,1016,1018, 1020,1022) of a character or word which is incorrectly recognized by the system as per the natural person;
    identify images, which are similar to an image of the character that has been identified by the natural person as being incorrectly recognized by the system (100), wherein the identified images are obtained from the image of the article (102);
    determine whether recognition of the character in the identified images is incorrect; and
    correct the recognition of the character in the identified images, wherever the recognition is determined as incorrect.

2. The system (100) as claimed in claim 1, wherein the processor (10) is configured to display characters or words as recognized by the system (100), adjacent to one or more images of corresponding characters or words obtained from the image (1004) of the article (102).

3. The system (100) as claimed in claim 1, wherein the processor (10) is configured to:
    segment the image (1004) of the article (102) to identify cells with a set of the characters in the image (104); and
    display characters (1008), present in a cell, as recognized by the system (100), adjacent to an image of the cell obtained from the image (1004) of the article (102).

4. The system (100) as claimed in claim 1, wherein the system (100) comprises at least one server (106), wherein the server (106) comprises a digital repository (302) of images of characters, wherein each of the images are labelled, wherein the server (106) is configured to:
    identify a set of images, present in the digital repository (302), which are similar to an image of the character that has been identified by the natural person as being incorrectly recognized by the system (100);
    determine whether a label assigned to the image of the character identified by the natural person, as a result of the correction, matches with labels of the identified images;
    assign a confidence score to the label of the image of the character identified by the natural person based at least on instances of matches with the labels of the identified images; and
    incorporate the image of the character identified by the natural person, and the corresponding label and the confidence score to the digital repository (302).

5. The system (100) as claimed in claim 4, wherein the server (104) is configured to refine a machine learning model (306) for character recognition based on at least the images of the characters, and their corresponding label and the confidence score.

6. The system (100) as claimed in claim 5, wherein the server (104) is configured to communicate the machine learning model (306), which is refined to a community of natural persons with computing devices, wherein the community is determined based on characteristics comprising at least one of geography, demography or profession.

7. The system (100) as claimed in claim 4, wherein confidence score is further based on a reputation score of the natural person, wherein the server (106) is configured to compute the reputation score based on at least one of historical data associated with matches between label assigned by the natural person with labels selected from the digital repository (306).

8. The system (100) as claimed in claim 1, wherein the processor (10) is in a mobile computing and communication device (104) comprising:
   a local repository (212) comprising images of characters; and
   a character recognition module (208) for recognizing characters present in images received by the mobile computing and communication device (104) wherein, the processor (10) is configured to, select the images of the one or more variants (1012, 1014,1016,1018, 1020, 1022) of the character for display, from the local repository (212), thereby enabling recognition of characters, providing of user feedback and reception of system feedback in the absence of internet.

9. The system (100) as claimed in claim 1, wherein the article (102) is a structured or semi-structured document.

10. A method for improving recognition of handwritten characters, the method comprising:
   receive an image (1004) of an article (102) comprising the handwritten characters;
   recognize the characters present in the image;
   displaying characters as recognized;
   receiving user feedback from a natural person, wherein the user feedback is a correction of an error made in recognizing at least one character;
   providing a system feedback, wherein the system feedback comprises displaying images of one or more variants (1012, 1014,1016,1018, 1020,1022) of a character which is incorrectly recognized as per the natural person;
   identifying a set of images, which are similar to an image of the character that has been identified by the natural person as being incorrectly recognized;
   determining whether a label assigned to the image of the character identified by the natural person, as a result of the correction, matches with labels of the identified images;
   assigning a confidence score to the label of the image of the character identified by the natural person based at least on instances of matches with the labels of the identified images; and
   incorporating the image of the character identified by the natural person, and the corresponding label and the confidence score to a digital repository (302).

11. The method as claimed in claim 10, comprising:
   segmenting the image (1004) of the article (102) to identify cells with a set of the characters in the image (104); and
   displaying characters (1008), present in a cell, as recognized, adjacent to an image of the cell obtained from the image (1004) of the article (102).

12. The method as claimed in claim 10, comprising, refining a machine learning model (306) for character recognition based on at least the images of the characters, and their corresponding label and the confidence score.

13. The method as claimed in claim 10, comprising:
   selecting the images of the one or more variants (1012, 1014,1016,1018, 1020,1022) of the character for display, from a local repository (212) of a mobile computing and communication device (104), thereby enabling recognition of characters, providing of user feedback and reception of system feedback in the absence of internet.

\* \* \* \* \*